(12) United States Patent
Kwok et al.

(10) Patent No.: US 9,832,650 B2
(45) Date of Patent: Nov. 28, 2017

(54) DYNAMIC WLAN CONNECTIONS

(71) Applicant: T-Mobile USA, Inc., Bellevue, WA (US)

(72) Inventors: Ming Shan Kwok, Seatle, WA (US); Hongliang Zhang, Samammish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 111 days.

(21) Appl. No.: 14/987,250

(22) Filed: Jan. 4, 2016

(65) Prior Publication Data
US 2017/0195883 A1 Jul. 6, 2017

(51) Int. Cl.
*H04W 12/08* (2009.01)
*H04W 84/12* (2009.01)
*H04W 4/14* (2009.01)

(52) U.S. Cl.
CPC ............. *H04W 12/08* (2013.01); *H04W 4/14* (2013.01); *H04W 84/12* (2013.01)

(58) Field of Classification Search
CPC ........ H04W 12/08; H04W 4/14; H04W 84/12
See application file for complete search history.

(56) References Cited

U.S. PATENT DOCUMENTS

| 9,635,705 B2 * | 4/2017 | Lu ......................... H04W 84/00 |
| 2007/0189218 A1 * | 8/2007 | Oba ...................... H04W 36/12 |
| | | 370/331 |
| 2009/0316672 A1 | 12/2009 | Balasubramanian et al. |
| 2014/0176659 A1 | 6/2014 | Khay-Ibbat et al. |
| 2014/0286308 A1 | 9/2014 | Lee et al. |
| 2014/0287760 A1 * | 9/2014 | Spinelli ................. H04W 92/02 |
| | | 455/437 |
| 2015/0350983 A1 | 12/2015 | Kwok et al. |

FOREIGN PATENT DOCUMENTS

WO  WO2014202117  12/2014

OTHER PUBLICATIONS

PCT Search Report and Written Opinion dated Apr. 13, 2017 for PCT Application No. PCT/US16/68668, 12 pages.

* cited by examiner

*Primary Examiner* — Wei Zhao
(74) *Attorney, Agent, or Firm* — Lee & Hayes, PLLC

(57) ABSTRACT

A cellular communications network is configured to support calling over untrusted networks such as the Internet. A cellular communications device is used to place and receive calls through the private, trusted cellular communications network. In addition, the device has a WLAN interface for connection to a wireless network access point such as a Wi-Fi access point, and for communication through the Internet. When conducting a voice or video call, the device establishes a secure communication tunnel with a gateway of the cellular communications network through the Internet and communicates voice and/or video data through the secure communication tunnel. The WLAN interface and secure communication tunnel may be disabled during periods when calls are not being conducted. When a call is placed to the device, a message is sent to the device requesting that the device activate its WLAN interface and/or establish a secure communication tunnel with the gateway.

20 Claims, 4 Drawing Sheets

# DYNAMIC WLAN CONNECTIONS

BACKGROUND

The use of mobile devices such as cellular telephones and other devices with cellular data connectivity is proliferating. Almost everyone has some sort of mobile, data-enabled device, and some people have multiple such devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications to provide user experiences like never before. Consequently, people are using their mobile devices more frequently, and have larger bandwidth requirements for data, email, voice, etc. This increased usage puts a tremendous strain on cellular networks that provide wireless communication services.

Mobile devices often offer alternative means for wireless connectivity, in addition to cellular connectivity. For example, mobile devices may provide wireless local-area network (WLAN) connectivity, in which the device uses a dedicate radio transceiver to connect through a wireless network access point (AP) to local-area and wide-area networks, including the Internet. WLAN connectivity can also be used to connect with the core network of a cellular services operator. In particular, WLAN technologies such as Wi-Fi can be used to carry data for voice calls, video calls, and SMS messaging. However, this typically requires that the mobile device maintain a constant connection to a wireless network access point as well as actively maintaining a secure data connection with a cellular network gateway through an untrusted and/or public network such as the Internet.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
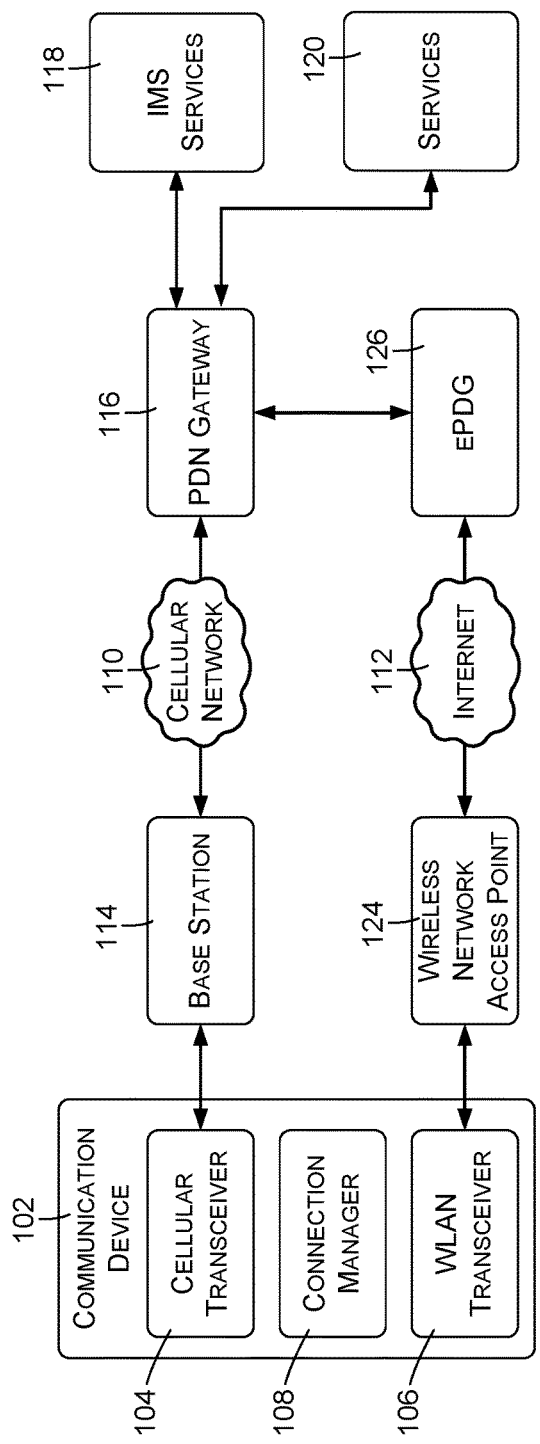
FIG. 1 is a block diagram illustrating an example system that uses both a trusted cellular network and an untrusted data communications network for calls to and from a communication device.

The described implementations provide devices, systems, and methods that allow a cellular communication device to use wireless local-area networking (WLAN) or other untrusted wireless connectivity, in addition to cellular connectivity, for conducting various types of real-time communications such as voice calls, video calls, and real-time text messaging.

When a user initiates a call, the communication device sets up a connection to a cellular network gateway by doing one or more of the following: (a) enabling a WLAN radio on the device; (b) connecting to and authenticating with a wireless network access point for communications with services available through an untrusted data communication network such as the Internet; (c) establishing a secure communication tunnel with the cellular network gateway; and (d) transferring real-time data such as voice data, video data, and/or text data with the cellular network through the secure communication tunnel. After completion of the call, the communication device may destroy the secure communication tunnel. The communication device may also disconnect from the Wi-Fi access point and disable the WLAN radio of the device.

When a call is initiated to the communication device, the cellular network sends a connection request to the device or otherwise signals the device that a call is being placed to the device. For example, the connection request may be transmitted to the device using the cellular communication capabilities of the device, through the trusted cellular network of the cellular services provider. Alternatively, in situations where the WLAN capabilities of the device are already enabled and the device is already connected to a wireless network access point, the connection request may be communicated to the device using an untrusted connection such as may be conducted through the Internet.

The connection request causes the device to establish a secure communication tunnel through the Internet, between the communication device and the cellular network gateway. More specifically, depending on the current WLAN connection status of the device, the connection request may cause the communication device to perform any one or more of the following: (a) enabling WLAN radio of the device; (b) connecting to and authenticating with a wireless network access point for communications with services available through the Internet; and (c) establishing a secure communication tunnel with the cellular network gateway. The call can then be completed through the secure communication tunnel using WLAN voice techniques, such as voice-over-IP (VOIP), voice-over-WiFi (VoWiFi), etc. After completion of the call, the communication device may destroy the secure communication tunnel. The device may also, in certain situations, disconnect from the wireless network access point and disable the WLAN radio of the device.

The communication device may be configured to periodically report its current WLAN status to the cellular network. For example, the communication device may be configured to report whether it is currently connected to a wireless network access point. In the case where the device is currently connected through a wireless network access point to the Internet, the communication device may periodically report its network IP address to the cellular network. When sending a connection request through the Internet to the communication device, the cellular network may send the connection request to the IP address most recently reported by the device.

FIG. 1 illustrates a mobile communication system 100 in which the described techniques may be implemented. The system 100 may in some cases be implemented at least in part by a wireless cellular communication infrastructure, such as a communication infrastructure implemented in accordance with the System Architecture Evolution (SAE) communication standard and provided by a cellular communication services provider. The system 100 may also utilize wireless networking or WLAN technologies such as Wi-Fi, as well as a public communication infrastructure such as the Internet. In certain implementations, the system 100 may be implemented at least in part as a long-term evolution (LTE) cellular network. The system 100 may also provide components and functionality supporting voice over Wi-Fi (VoWiFi) services, or more generally voice over wireless local-area network (VoWLAN) services. These services may also be referred to as Wi-Fi or WLAN calling services.

The mobile communication system 100 may comprise multiple mobile communication devices 102, which are also referred to as mobile communication terminals or user equipment (UE). For purposes of illustration, only a single mobile communication device 102 is illustrated in FIG. 1. The communication device 102 may comprise a telecommunication device such as a wireless telephone handset or smartphone, which provides wireless network communications through one or more cellular telecommunication networks provided by cellular service providers. The communication device 102 may have a cellular transceiver 104 and/or other radios that provide wireless communications between the communication device 102 and the cellular telecommunication network through base stations and associated towers and/or antennas of the cellular telecommunication network. The communication device 102 may also have a WLAN transceiver 106, also referred to as a wireless local-area networking (WLAN radio) and/or other radios that enable access by the communication device 102 to local-area or wide-area networks, including the Internet. The WLAN transceiver 106 may implement wireless communications in accordance with one or more variants of the IEEE 802.11 standard. The WLAN transceiver 106 enables the communication device 102 to wirelessly communicate over short ranges with a wireless network access point, through the access point to a packet-based and/or IP-based network such as the Internet, and with other devices on the Internet and accessible via the Internet.

In certain embodiments, the communication device 102 may comprise a tablet computer, a laptop computer, a wearable device, a media player, or any other type of device that is configured to be used for real-time wireless voice communications, real-time wireless video communications, and/or other wireless real-time communications such as SMS (short messaging service) text messaging. Furthermore, the techniques described herein may be implemented and/or used in conjunction with devices other than mobile devices, such as desktop computers, network-enabled appliances, home security systems, home automation systems, industrial control systems, automotive computers, and other types of devices and systems.

The communication device 102 may have a connection manager 108 that implements voice calls and other real-time communications to and from the communication device 102. The connection manager 108 may be configured to establish and conduct calls using either the cellular transceiver 104 through a cellular telecommunication network or the WLAN transceiver 106 through an untrusted network such as the Internet. The connection manager 108 may be supported by and/or may use the services of various hardware and software components of the communication device 102, which may include communication protocol stacks and other operating system components (not shown), the cellular transceiver 104, and the WLAN transceiver 106. The connection manager 108 may be part of the operating system of the communication device 102 or may be implemented in part by one or more applications installed on the communication device 102.

At various times, depending on settings and conditions, a voice call may be established using either a trusted cellular communication network 110 of a cellular service provider or using an untrusted communications network such as the Internet 112. When using the trusted cellular communication network 110, the communication device 102 may use its cellular transceiver 104 to communicate wirelessly with a base station 114 associated with the cellular communications network 110, such as a Node B or eNodeB base transceiver station (BTS). A cellular services provider may provide numerous base stations 114 at different geographic locations. In an LTE environment, the communication device 102 communicates through a nearby base station 114 and through the private cellular communication network 110 to connect with a packet data network (PDN) gateway 116. The PDN gateway 116 acts as a router for traffic between the device 102 and various packet-based networks and services, including IMS services 118 and other services 120. The cellular communications network 110 and a packet data network (PDN) gateway 116 together are generally referred as the core network (not shown) or Evolved Packet Core (EPC) that conducts device's mobility managements and facilitates IP connectivity between the communication device 102 and various packet-based networks and services, including IMS services 118 and other services 120. The IMS (Internet Multi-Media Subsystem) services 118 are responsible for controlling and/or enabling voice/video call & messaging applications. The PDN gateway 116 allows access by the communication device 102 to the IMS services 118. The other services 120 include services of the cellular services provider as well as external services, including Internet-based services. The PDN gateway 116 allows access by the communication device 102 to the other services 120.

When using an untrusted wireless connection for a voice call, the communication device 102 may use its WLAN transceiver 106 to communicate wirelessly with a wireless network access point (AP) 124 that provides access to an untrusted network such as the Internet 112. The cellular communications provider may provide an ePDG (evolved packet data gateway) 126 that is accessible through the Internet 112 to facilitate communications between the device 102 and the PDN gateway 116. The ePDG 126 acts as an interface between the core network and any untrusted communication networks.

Figure 2:
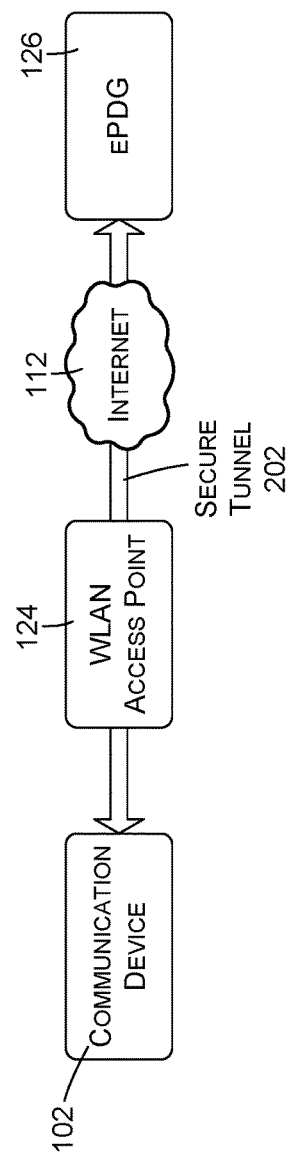
FIG. 2 is a block diagram illustrating a technique for communicating between the communication device and a gateway of a cellular communication service for communicating call data.

FIG. 2 shows further details regarding communications between the communication device 102 and the ePDG 126 when conducting a voice call using an untrusted communication network such as the Internet 112. In order to provide secure communications between the device 102 and the ePDG 126, the device 102 establishes a secure communication tunnel 202 between the device 102 and the ePDG 126. The tunnel 202 may comprise an IPSec (Internet protocol security) tunnel or some other form of encrypted communications channel or communication protocol. During a call, voice data and other data is transferred through the secure tunnel 202 between the communication device 102 and the ePDG 126. The ePDG 126 in turn routes communications between the communication device 102 and the PDN gateway 116.

In many situations, the secure communication tunnel 202 may be maintained even during periods when a voice call is not being conducted so that the communication device 102 can receive notifications of incoming calls and other communications through the secure tunnel 202. In order to reduce power consumption and load to the ePDG 126, however, the secure communication tunnel 202 may be terminated during periods when voice calls are not being conducted, and may be dynamically established and maintained during periods of time when voice calls are being actively conducted with the communication device 102. In some implementations, the WLAN transceiver 106 may be disabled or powered off during periods when a voice call is not being conducted with the communication device 102. Upon placing a call from the communication device 102 or upon a call being placed to the communication device 102, the WLAN transceiver 106 may be activated, a wireless connection to the wireless network access point 124 may be established, the secure tunnel 202 may be established, and audio, video, and/or other data may be communicated between the communication device 102 and the core network through the secure tunnel 202. After completion of the call, the secure tunnel 202 may be destroyed, and the WLAN transceiver 106 may be disabled to conserve power.

Figure 3:
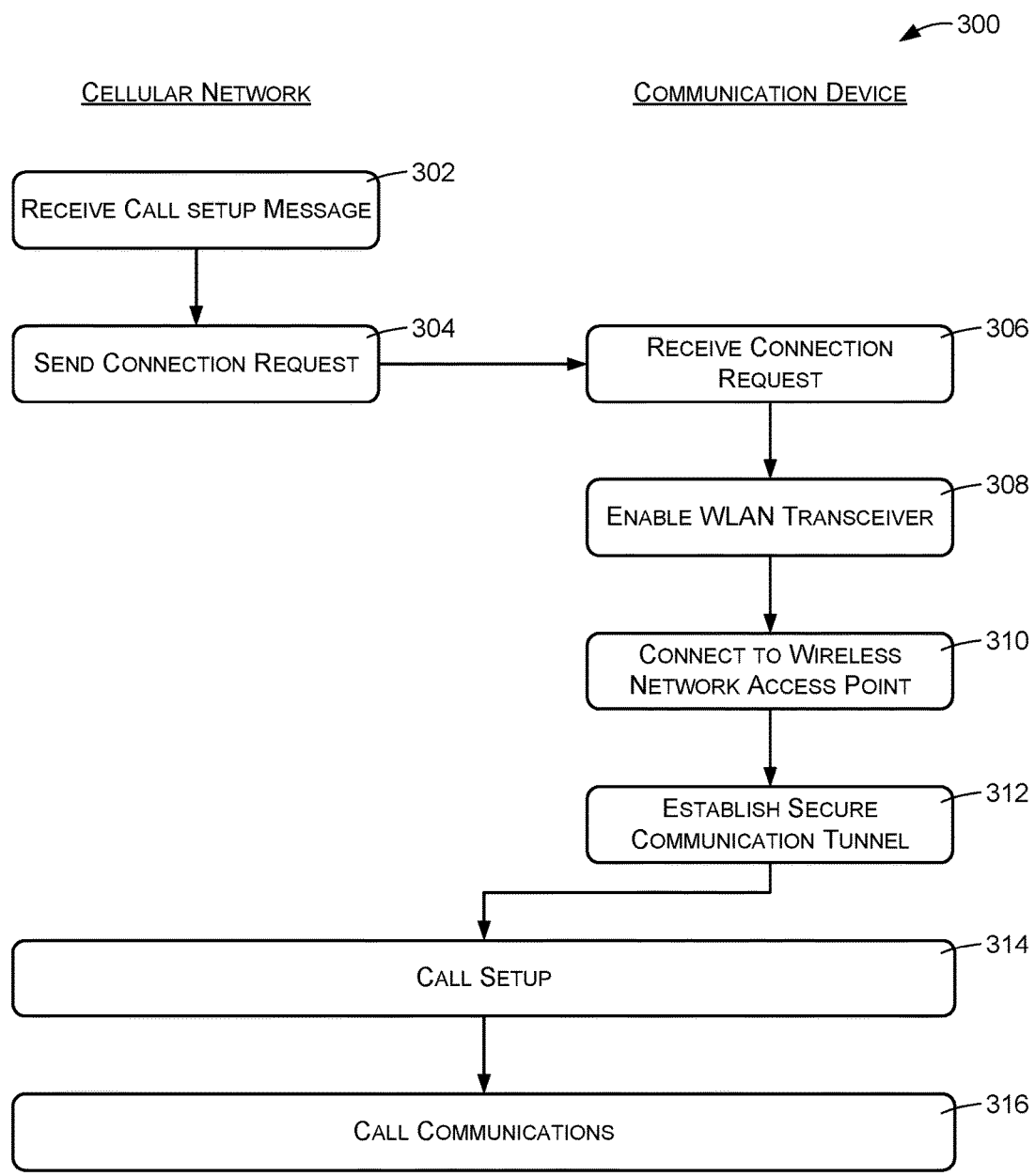
FIG. 3 is a flow diagram illustrating an example method of dynamically establishing a wireless network connection for conducting calls to the communication device.

FIG. 3 illustrates an example method 300 of initiating a voice call to the communication device 102 or other cellular communication device. Actions on the left side of FIG. 3 are performed by components or elements of a cellular communications network. Actions on the right side of FIG. 3 are performed by the communication device 102. The actions at the bottom of FIG. 3, which span both the left and right sides of FIG. 3, are performed by the cellular communications network and the communication device 102 in cooperation with each other.

The method 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other methods described throughout this disclosure, in addition to method 300, shall be interpreted accordingly.

An action 302 comprises receiving a call setup message for a voice call to the device 102. The call setup message may indicate or may be performed in response to a call from another telecommunications device, and may be received by the core network and/or other components of the cellular services provider.

An action 304, performed in response to receiving the call setup message, comprises sending a connection request to the communication device 102. As an example, the connection request may comprise a predefined and/or proprietary instruction or code that the communication device 102 interprets as a request to establish a secure communication tunnel with the ePDG 126.

An action 306, performed by the device 102, comprises receiving the connection request. In response to receiving the connection request, an action 308 is performed of activating and/or enabling the WLAN transceiver 106. In addition, the device 102 performs an action 310 of establishing data communications with the Wi-Fi network access point, thereby enabling communication by the device 102 with the Internet 112 and with other entities and services that are accessible through the Internet.

Further in response to receiving the connection request, an action 312 comprises establishing the secure communication tunnel 202 through an untrusted communication network, such as the Internet 112, between the device 102 and a data gateway of the cellular services provider, such as the ePDG 126. The secure communication tunnel may, for example, comprise an IPSec communication tunnel and may be established using protocols specified by the IPSec standard. Other types of secure communications may be used in place of the IPSec protocol in certain embodiments.

After establishing the secure communication tunnel 202, the device 102 and the core network communicate with each other to perform call setup 314 in accordance with IMS (IP multi-media system) and/or SIP (session initiation protocol) call signaling, with communications between the core network and the device 102 taking place through the secure tunnel 202. After call setup, an action 316 is performed, comprising communicating audio voice data and control data between the device 102 and the core network. In the case of video calls, the action 316 may also comprise communicating video data between the device 102 and the core network.

The connection request may be communicated between the device 102 and the cellular communication network using any currently available means of communication. For example, during times when the device 102 is maintaining cellular communications through the cellular base station 114, the connection request may be communicated to the device 102 through cellular communications, using the base station 114 and the cellular transceiver 104 of the device 102. During times when the device 102 is connected to the Internet 112 through a non-cellular connection such as a Wi-Fi or other WLAN connection using the wireless network access point 124, the connection request may be communicated to the device 102 through Internet or IP communications, using the current IP address of the device 102 and a predefined communication port designated for receiving messages from the cellular services provider. In some cases, the connection request may be transmitted to the last-known IP address of the communication device 102, which is recorded upon each communication with the communication device 102.

Figure 4:
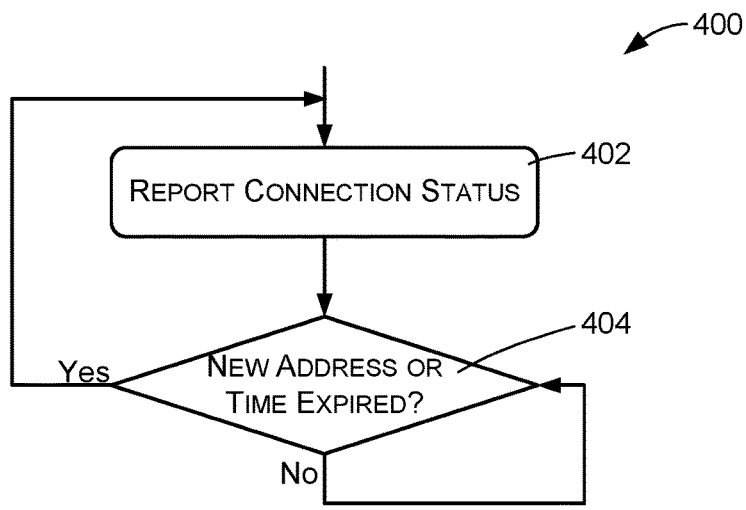
FIG. 4 is a flow diagram illustrating an example method of reporting connection status of the communication device.

FIG. 4 illustrates an example method 400 that may be used in conjunction with the techniques described above to provide updated availability information to the cellular ePDG 126 so that the cellular communications network can contact and communicate with the device 102 through an untrusted IP network when needed in order to provide the connection request. The method 400 may be performed by the device 102 when connected through the WLAN access point 124 or other means to the Internet 112.

The example method 400 comprises an action 402 of repeatedly and/or periodically providing an availability message indicating the connection status of the device 102. The action 402 may comprise sending an availability message to a network-accessible API (application programming interface) of the ePDG 126, indicating that the device 102 is connected to the Internet and indicating a current IP address of the device, to which the ePDG 126 may send messages such as a connection request. The ePDG receives and stores the current IP address for future reference when contacting the device 102.

An action 404 comprises determining whether a predefined time has elapsed since reporting the connection status of the device 102 to the ePDG 126 and/or determining whether the IP address of the device 102 has changed. For example, the IP address of the device 102 may change when the device is connected to a different wireless network access point. If the predefined time has elapsed or the device 102 has a new or different IP address, the action 402 is repeated and the connection status, including the device IP address, is reported anew to the ePDG 126. Otherwise, the action 404 is repeated until the predefined time has elapsed or until device 102 has a new or different IP address.

Although the examples above are described with respect to voice calls, calls conducted using the described techniques may also, or alternatively, comprises video and/or text. SMS text messaging, for example, may be conducted using the described techniques. In addition, the described techniques may be used in environments other than LTE systems.

Figure 5:
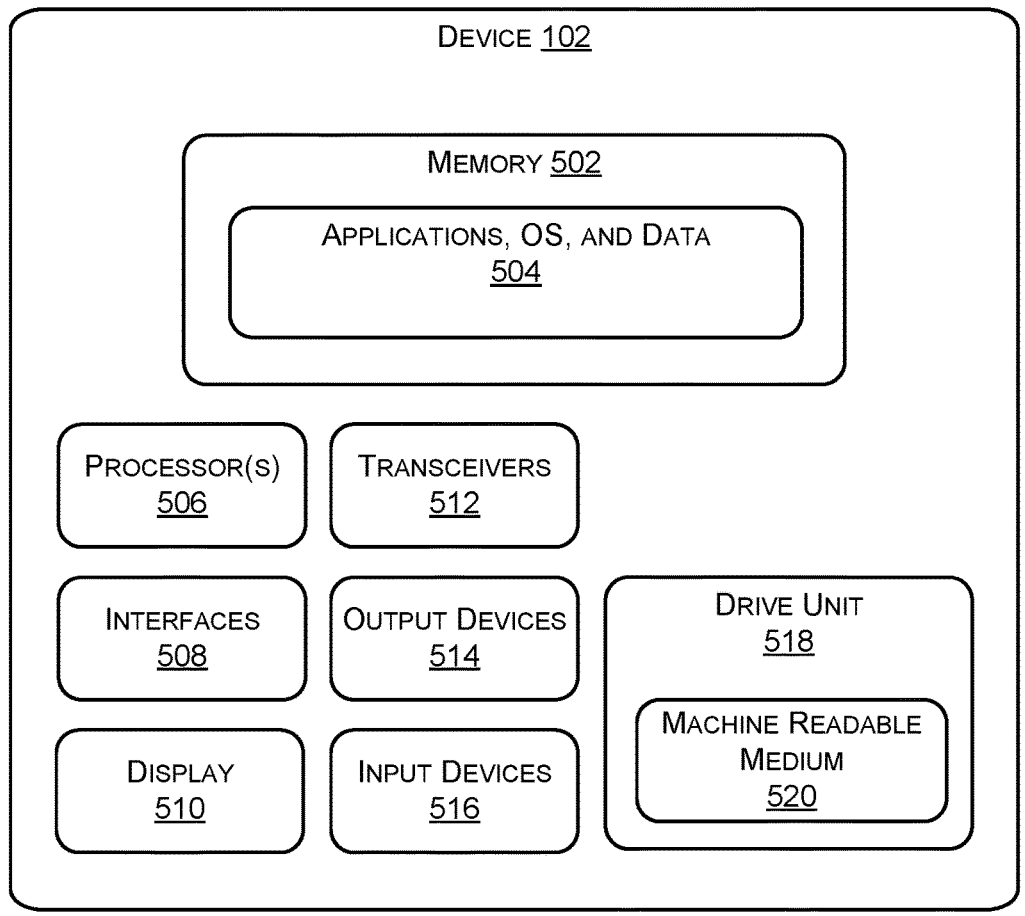
FIG. 5 is a block diagram illustrating example components of a communication device.

FIG. 5 is a block diagram of an illustrative device 102 in accordance with various embodiments. As shown, the device 102 may include a memory 502, which may store applications, and operating system (OS), and data 504. The device 102 further includes processor(s) 506, interfaces 508, a display 510, transceivers 512 including the WLAN transceiver 106 and the cellular transceiver 104, output devices 514, input devices 516, and drive unit 518 including a machine readable medium 520.

In various embodiments, the memory 502 includes both volatile memory and non-volatile memory (e.g., RAM, ROM, EEPROM, flash memory, miniature hard drive, memory card, CD-ROM, digital versatile disks (DVD) or other optical storage, magnetic cassettes, magnetic tape, magnetic disk storage or other magnetic storage devices, or any other medium). Additionally, in some embodiments, the memory 502 includes a SIM (subscriber identity module) card, which is a removable memory card used to identify a user of the device 102 to a service provider network. The memory 502 can also be described as non-transitory computer storage media and may include volatile and nonvolatile, removable and non-removable media implemented in any method or technology for storage of information, such as computer readable instructions, data structures, program modules, or other data. The applications, OS, and data 504 are stored in the memory 502.

The memory 502 may be non-transitory computer-readable media implemented in technology for storage of information, such as computer readable instructions, data structures, program modules, or other data. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 102. Any such non-transitory computer-readable media may be part of the device 102.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. The interfaces 508 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 510 may comprise a liquid crystal display or any other type of display commonly used in telecommunication devices or other portable devices. For example, display 510 may be a touch-sensitive display screen, which may also act as an input device or keypad, such as for providing a soft-key keyboard, navigation buttons, or the like.

In some embodiments, the transceivers 512 include any sort of transceivers known in the art. For example, transceivers 512 may include radio transceivers and interfaces that performs the function of transmitting and receiving radio frequency communications via an antenna. The radio interfaces facilitate wireless connectivity between the device 102 and various cell towers, base stations and/or access points.

In some embodiments, the output devices 514 include any sort of output devices known in the art, such as a display (already described as display 510), speakers, a vibrating mechanism, or a tactile feedback mechanism. The output devices 514 also include ports for one or more peripheral devices, such as headphones, peripheral speakers, or a peripheral display.

In various embodiments, the input devices 516 include any sort of input devices known in the art. For example, the input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 520 stores one or more sets of instructions (e.g., software) that embodying operating logic for implementing and/or performing any one or more of the methodologies or functions described herein. The instructions may also reside, completely or at least partially, within the memory 502 and within the processor 506 during execution thereof by the telecommunications device 500. The memory 502 and the processor 506 also may constitute machine readable media 520.

Figure 6:
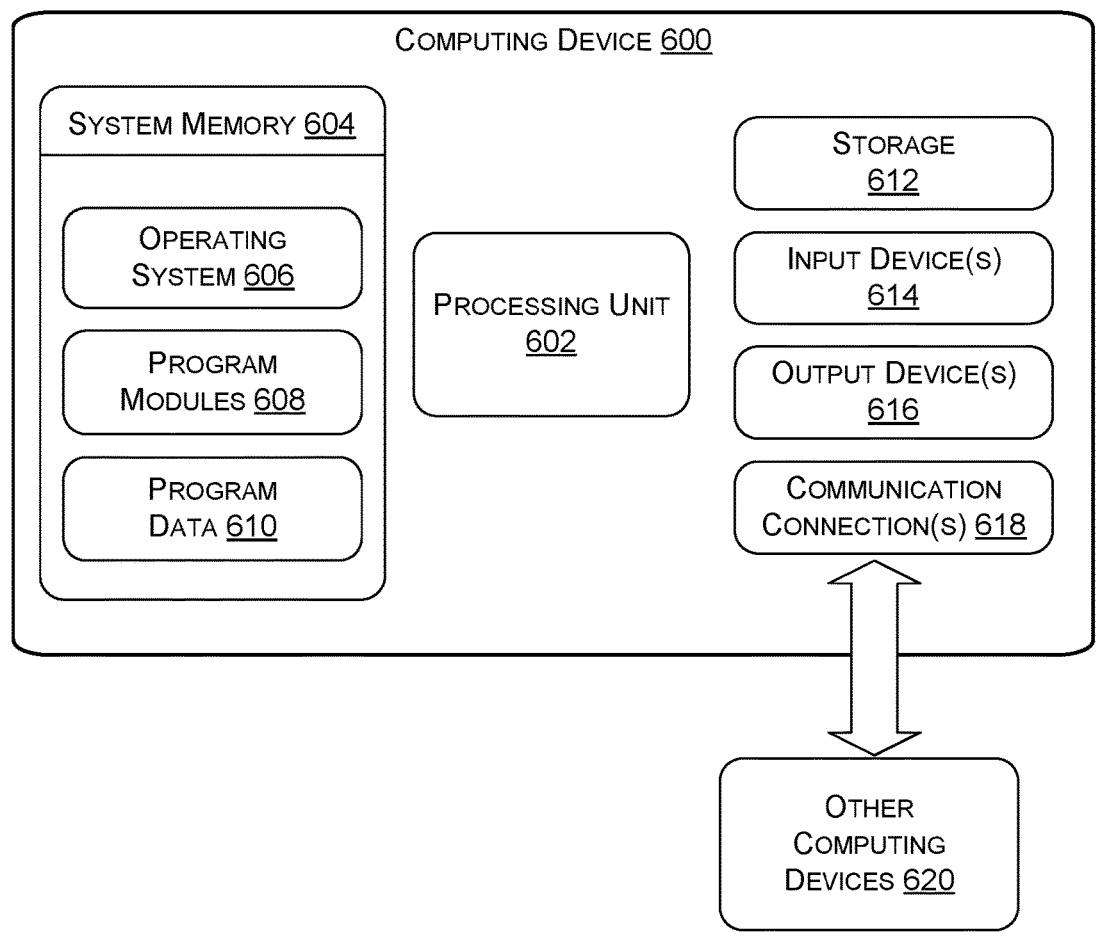
FIG. 6 is a block diagram illustrating example components of a computing device that may be used to implement various functions of a cellular communication system.

FIG. 6 is a block diagram of an illustrative computing device 600 such as may be used to implement the ePDG 126 and/or other gateways and components of the system 100. In various embodiments, the computing device 600 may include at least one processing unit 602 and system memory 604. Depending on the exact configuration and type of computing device, the system memory 604 may be volatile (such as RAM), non-volatile (such as ROM, flash memory, etc.) or some combination of the two. The system memory 604 may include an operating system 606, one or more program modules 608, and may include program data 610.

The computing device 600 may also include additional data storage devices (removable and/or non-removable) such as, for example, magnetic disks, optical disks, or tape. Such additional storage is illustrated in FIG. 6 by storage 612.

Non-transitory computer storage media may include volatile and nonvolatile, removable and non-removable media implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such non-transitory computer-readable storage media may be part of the device 600.

In various embodiment, any or all of the system memory 604 and storage 612 may store programming instructions which, when executed, implement some or all of the function functionality described above as being implemented by a cellular services provider and/or components provided by a cellular services provider.

The computing device 600 may also have input device(s) 614 such as a keyboard, a mouse, a touch-sensitive display, voice input device, etc. Output device(s) 616 such as a display, speakers, a printer, etc. may also be included. The computing device 600 may also contain communication connections 618 that allow the device to communicate with other computing devices 620.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
  receiving a call setup message for a voice call to a device, wherein the device performs voice calls using a cellular communication network of a cellular services provider;
  sending a connection request to the device, wherein the connection request causes the device to establish a secure communication tunnel through an untrusted communication network between the device and a data gateway of the cellular services provider;
  communicating voice data with the device through the secure communication tunnel;
  at a completion of the voice call, sending an instruction to cause the device to tear down the secure communication tunnel;
  receiving a second call setup message for a second voice call to the device;
  sending a second connection request to the device, wherein the second connection request causes the device to reestablish the secure communication tunnel through the untrusted communication network; and
  communicating second voice data with the device through the secure communication tunnel.

2. The method of claim 1, wherein the untrusted communication network comprises the Internet.

3. The method of claim 1, wherein the secure communication tunnel comprises an Internet Protocol Security (IPSec) communication tunnel.

4. The method of claim 1, further comprising communicating video data with the device through the secure communication tunnel.

5. The method of claim 1, further comprising:
  receiving availability messages from the device indicating a current Internet Protocol (IP) address of the device;
  wherein sending the connection request comprises sending the connection request to the current IP address of the device.

6. The method of claim 1, wherein sending the connection request comprises sending the connection request to a last known Internet Protocol (IP) address of the device.

7. The method of claim 1, wherein sending the connection request comprises sending the connection request through the untrusted communication network to the device.

8. The method of claim 1, wherein sending the connection request comprises sending the connection request through the cellular communication network to the device.

9. A method comprising:
  receiving a connection request for a voice call by a device that performs voice calls using a cellular communication network of a cellular services provider;
  in response to receiving the connection request, establishing a secure communication tunnel through an untrusted communication network between the device and a data gateway of the cellular services provider;
  communicating voice data with the device through the secure communication tunnel;
  at a completion of the voice call, tearing down the secure communication tunnel;
  receiving a second connection request for a second voice call by the device;
  in response to receiving the second connection request, reestablishing the secure communication tunnel through the untrusted communication network; and
  communicating second voice data with the device through the secure communication tunnel.

10. The method of claim 9, further comprising, in response to receiving the connection request, enabling a radio for communication with a wireless network access point.

11. The method of claim 9, further comprising, in response to receiving the connection request, establishing communications with the untrusted communication network through a wireless network access point.

12. The method of claim 9, further comprising sending availability messages from the device indicating a current Internet Protocol (IP) address of the device.

13. The method of claim 9, wherein the connection request is received through the untrusted communication network.

14. The method of claim 9, wherein the connection request is received through the cellular communication network.

15. A device, comprising:
  a cellular radio configured to communicate voice data through a cellular communication network of a cellular services provider;
  a wireless local-area network (WLAN) radio configured provide data communications through a wireless network access point with an untrusted communication network;
  a memory device; and
  operating logic stored on the memory device and configured to perform actions comprising:
    receiving a connection request for a voice call; and
    in response to receiving the connection request, using the WLAN radio to establish a secure communication tunnel through the untrusted communication network between the device and a data gateway of the cellular services provider;

after the voice call, using the WLAN radio to tear down the secure communication tunnel through the untrusted communication network;

receiving a second connection request for a second voice call; and in response to receiving the second connection request, using the WLAN radio to reestablish the secure communication tunnel through the untrusted communication network.

16. The device of claim 15, the actions further comprising, in response to receiving the connection request, activating the WLAN radio.

17. The device of claim 15, further comprising, in response to receiving the connection request, activating the WLAN radio and establishing data communications with the wireless network access point.

18. The device of claim 15, the actions further comprising sending availability messages from the device indicating a current Internet Protocol (IP) address of the device.

19. The device of claim 15, wherein the connection request is received through the untrusted communication network.

20. The device of claim 15, wherein the connection request is received through the cellular communication network.

* * * * *